United States Patent [19]
Jurik et al.

[11] Patent Number: 6,099,038
[45] Date of Patent: Aug. 8, 2000

[54] UPPER AND LOWER MOUNTING BRACKET ASSEMBLY FOR A STEERING COLUMN OF AN AUTOMOTIVE VEHICLE

[75] Inventors: Mirjana Jurik, Rochester Hills; Rodney L. Eaton, Clarkston, both of Mich.; Kurt E. Hofmeister, Holland, Ohio; Gagan Tandon, Dearborn, Mich.

[73] Assignee: DaimlerChrysler Corporation, Auburn Hills, Mich.

[21] Appl. No.: 09/234,001

[22] Filed: Jan. 19, 1999

[51] Int. Cl.[7] .................................................... B62D 1/18
[52] U.S. Cl. ........................... 280/777; 280/779; 74/492; 188/371
[58] Field of Search .................................... 280/775, 777, 280/779; 74/492; 188/371

[56] References Cited

U.S. PATENT DOCUMENTS

| | | | |
|---|---|---|---|
| 4,838,576 | 6/1989 | Hamasaki et al. . | |
| 5,081,879 | 1/1992 | Pidgeon . | |
| 5,356,179 | 10/1994 | Hildebrandt et al. | 280/777 |
| 5,390,956 | 2/1995 | Thomas | 280/777 |
| 5,470,107 | 11/1995 | Muntener et al. . | |
| 5,497,675 | 3/1996 | Brown et al. | 74/492 |
| 5,498,032 | 3/1996 | Thomas | 280/777 |

FOREIGN PATENT DOCUMENTS 403 284476  12/1991  Japan ...................................... 280/777

*Primary Examiner*—Peter C. English
*Assistant Examiner*—Lynda Jasmin
*Attorney, Agent, or Firm*—Lawrence J. Shurupoff

[57] ABSTRACT

Apparatus for supporting a steering column of an automotive vehicle includes an upper mounting bracket secured to rigid vehicle support structure by capsules which release in response to longitudinal collapse of the steering column in a frontal impact. The upper mounting bracket is secured to and moves with the steering column during its collapse. A lower mounting bracket is rigidly secured to the vehicle support structure. Flexible, bendable U-shaped straps connect the upper mounting bracket to the lower mounting bracket to gradually resist collapse of the steering column and prevent excessive reaction forces of the steering column against a driver. The vehicle support structure overlies the upper mounting bracket to resist upward displacement during collapse with the steering column.

9 Claims, 5 Drawing Sheets

UPPER AND LOWER MOUNTING BRACKET ASSEMBLY FOR A STEERING COLUMN OF AN AUTOMOTIVE VEHICLE

BACKGROUND OF THE INVENTION

1. Field of the Invention

This invention relates to steering column support structure having upper and lower mounting brackets and an energy absorbing capability.

2. Description of Prior Developments

When a crash or collision occurs, the driver can be thrown forward against the steering wheel with great impact. It is desirable to provide a controlled collapse of the steering column to reduce the force of impact against the driver. As a steering column collapses, it also tends to pivot upwardly and thereby rise to a greater angle upon frontal impact, caused by the forward component of the force of the driver against the steering wheel. The rise of the steering column places the steering wheel/air bag assembly in an unfavorable position with respect to the driver. Accordingly, it is desirable not only to provide for a controlled collapse of the steering column, but also to prevent this tendency of the steering column to rise to a greater angle.

SUMMARY OF THE INVENTION

In accordance with the present invention, the steering column, which normally extends downwardly and forwardly from the steering wheel, is supported by an upper mounting bracket and a lower mounting bracket. The upper mounting bracket is secured to the steering column and to vehicle support structure. The connection to the vehicle support structure is releasable upon a frontal impact of sufficient severity, allowing the steering column to collapse in the direction of its length, that is, forwardly and downwardly.

The lower mounting bracket is also connected to rigid vehicle support structure. Straps in the form of generally U-shaped members each have one leg connected to the lower mounting bracket and a second leg connected to the upper mounting bracket to oppose the movement of the upper mounting bracket as it moves with the collapsing steering column.

Further in accordance with the invention, the upper mounting bracket has laterally spaced upper wing portions which are releasably connected to the vehicle support structure, and also has a lower end portion which is slidably received in a central channel of the lower mounting bracket. The upper mounting bracket underlies certain vehicle support structure which prevents the upper bracket, and hence the steering column connected thereto, from rising. Accordingly, the steering column is guided in its collapse, but prevented from rising.

Preferably, the straps are integrally connected together by an intermediate saddle, the saddle and straps being of one piece. This saddle forms a cap which receives the lower end of the upper mounting bracket.

Preferably, the channel of the lower mounting bracket has integral ribs and beads which have a frictional sliding contact with the lower end portion of the bracket, guiding its downward and forward movement.

One object of this invention is to provide support structure for a steering column of a motor vehicle having the foregoing features and capabilities.

Other objects, features and advantages of the invention will become more apparent as the following description proceeds, especially when considered with the accompanying drawings.

DETAILED DESCRIPTION OF THE PREFERRED EMBODIMENT

Figure 1:
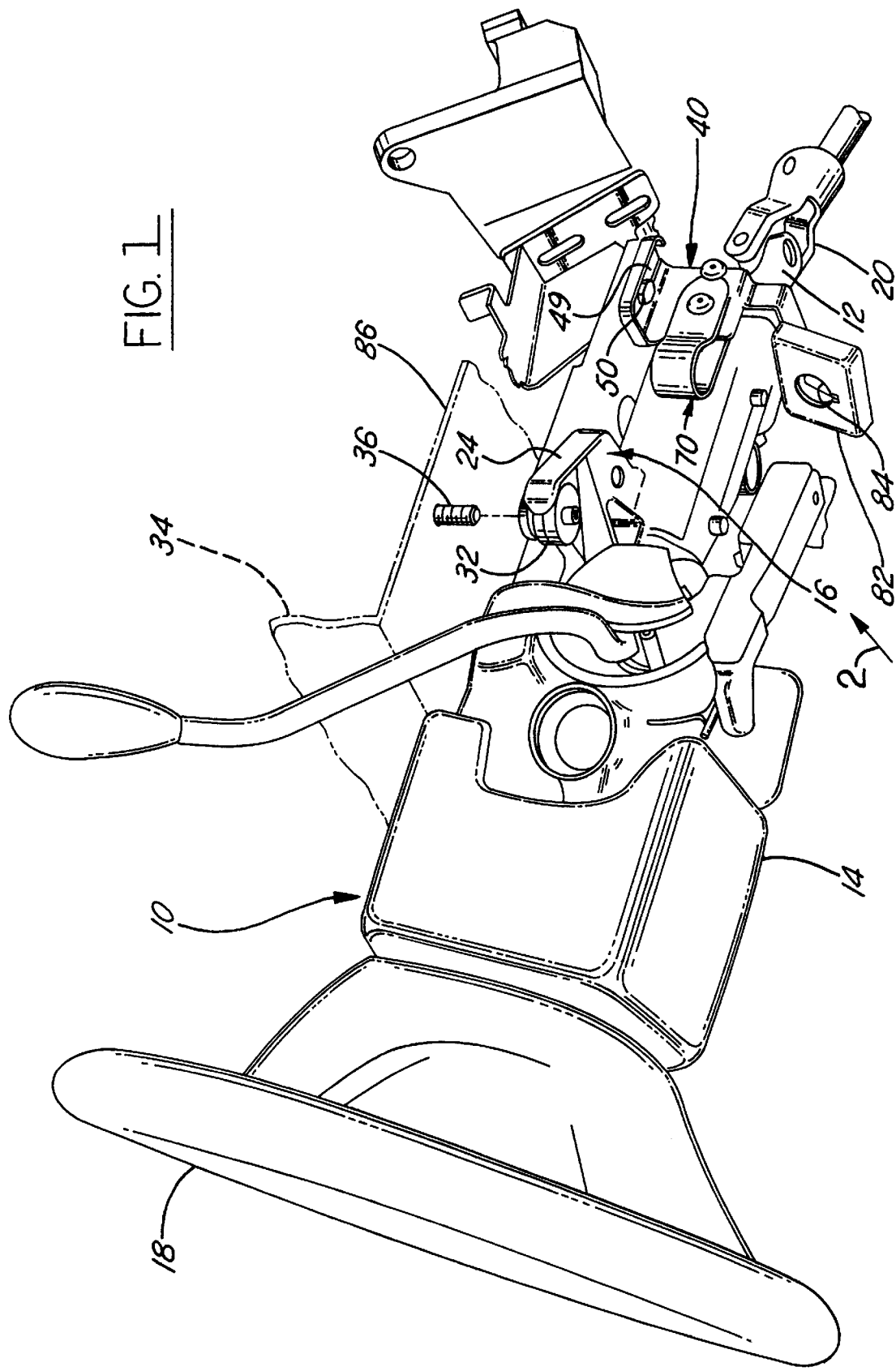
FIG. 1 is a perspective view of a steering column supported by upper and lower mounting brackets, in accordance with the present invention.

Referring now more particularly to the drawings, an elongated steering column 10 which extends in a downward and forward direction has a steering shaft 12 within a housing 14. The housing 14 is rigidly secured to an upper mounting bracket 16. The steering shaft has a steering wheel 18 at the upper end and a shaft coupler 20 at the lower end which is adapted to be connected to a steering gear assembly (not shown) to steer the front wheels of an automotive vehicle. The upper mounting bracket 16 is rigidly connected to and in effect becomes a rigid part of the steering column 10, and has a central passage 22 through which the steering shaft 12 passes.

Figure 2:
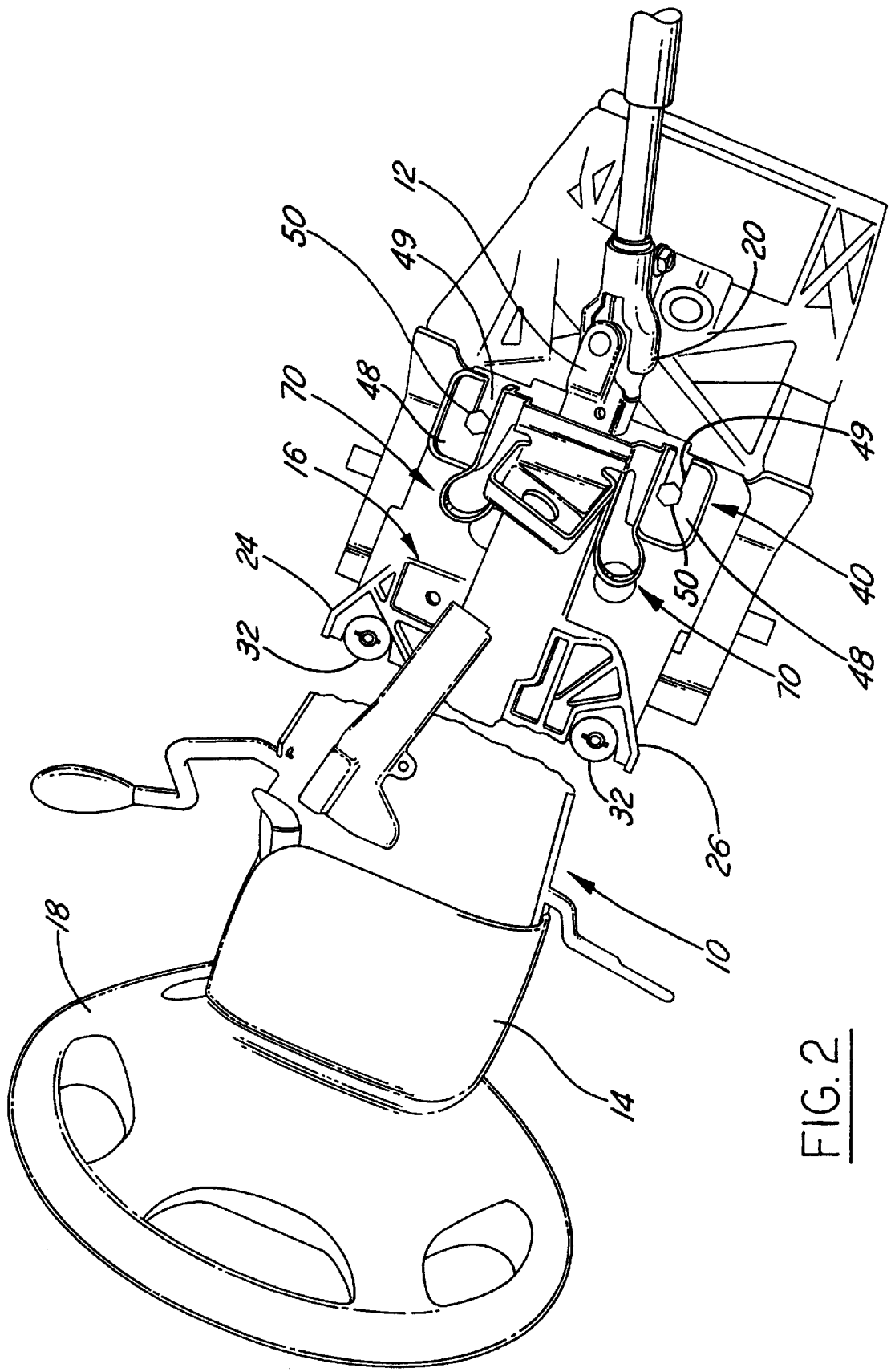
FIG. 2 is a perspective view looking in the direction of the arrow 2 in FIG. 1.
Figure 6:
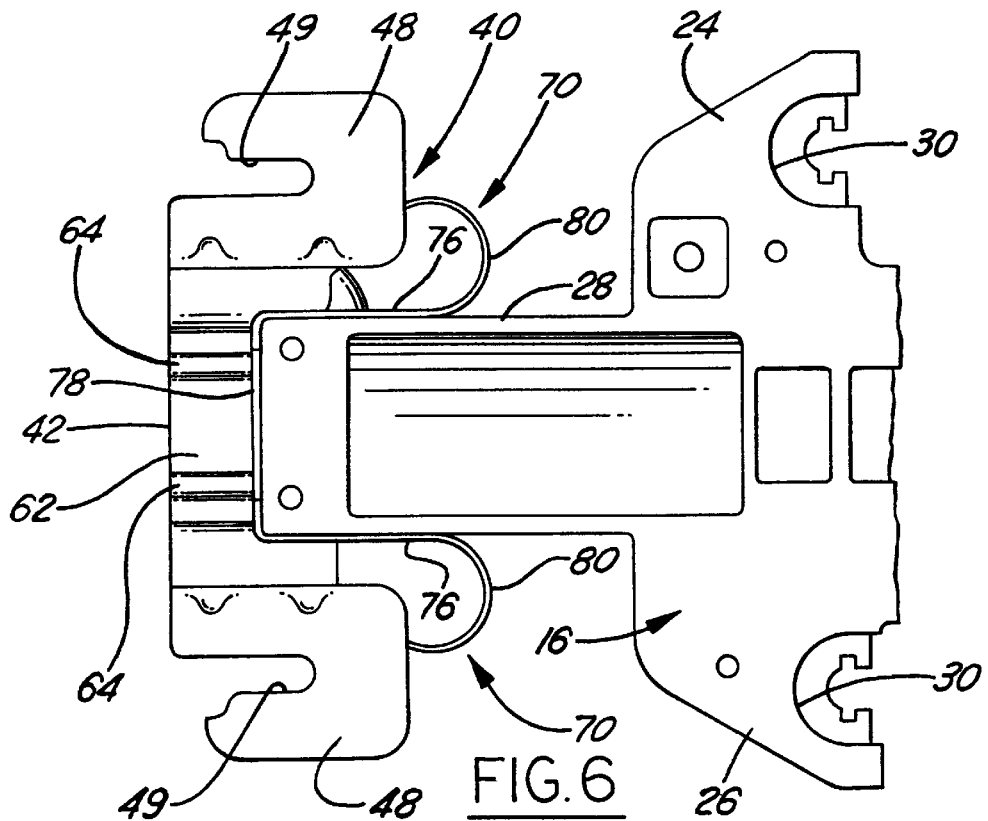
FIG. 6 is a fragmentary plan view showing the lower mounting bracket and a portion of the upper mounting bracket.
Figure 7:
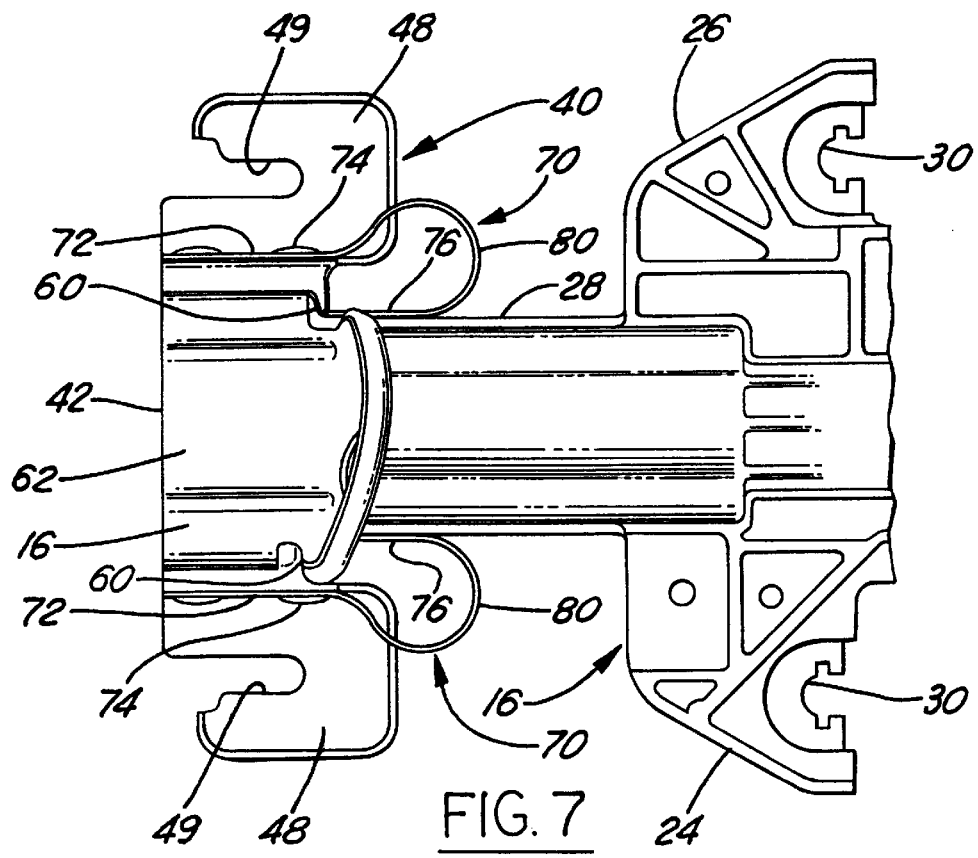
FIG. 7 is a bottom plan view of the structure shown in FIG. 6.

The upper mounting bracket 16 as seen in FIGS. 6 and 7 has laterally spaced upper wing portions 24 and 26 extending laterally outwardly, and a downwardly extending lower end portion 28. Each of the wing portions 24, 26 has a rearwardly opening slot 30 in which a capsule 32 is mounted. See FIGS. 1 and 2. The capsules 32 are rigidly secured to vehicle support structure 34 by fasteners 36. The construction is such that while the capsules 32 are rigidly secured to the vehicle support structure 34, the connections of the capsules to the upper wing portions 24, 26 of the upper mounting bracket 16 are releasable so that the upper mounting bracket can move with the steering column 10 when and if the steering column collapses along its longitudinal axis in response to a substantial frontal impact.

A lower mounting bracket 40 is spaced from the upper mounting bracket 16 in a downward and forward direction and has a central channel 42 with side walls 44 terminating at their upper ends in laterally outwardly extending flanges 48. Each of the flanges 48 has a forwardly opening slot 49 to receive a fastener 50. The fasteners 50 are rigidly secured to a portion 52 of the rigid vehicle support structure 34 and, because the slots 49 open forwardly and are closed at their rear ends, the lower mounting bracket 40 is firmly anchored in position and will not collapse with the steering column and upper mounting bracket in the event of a frontal impact.

Figure 3:
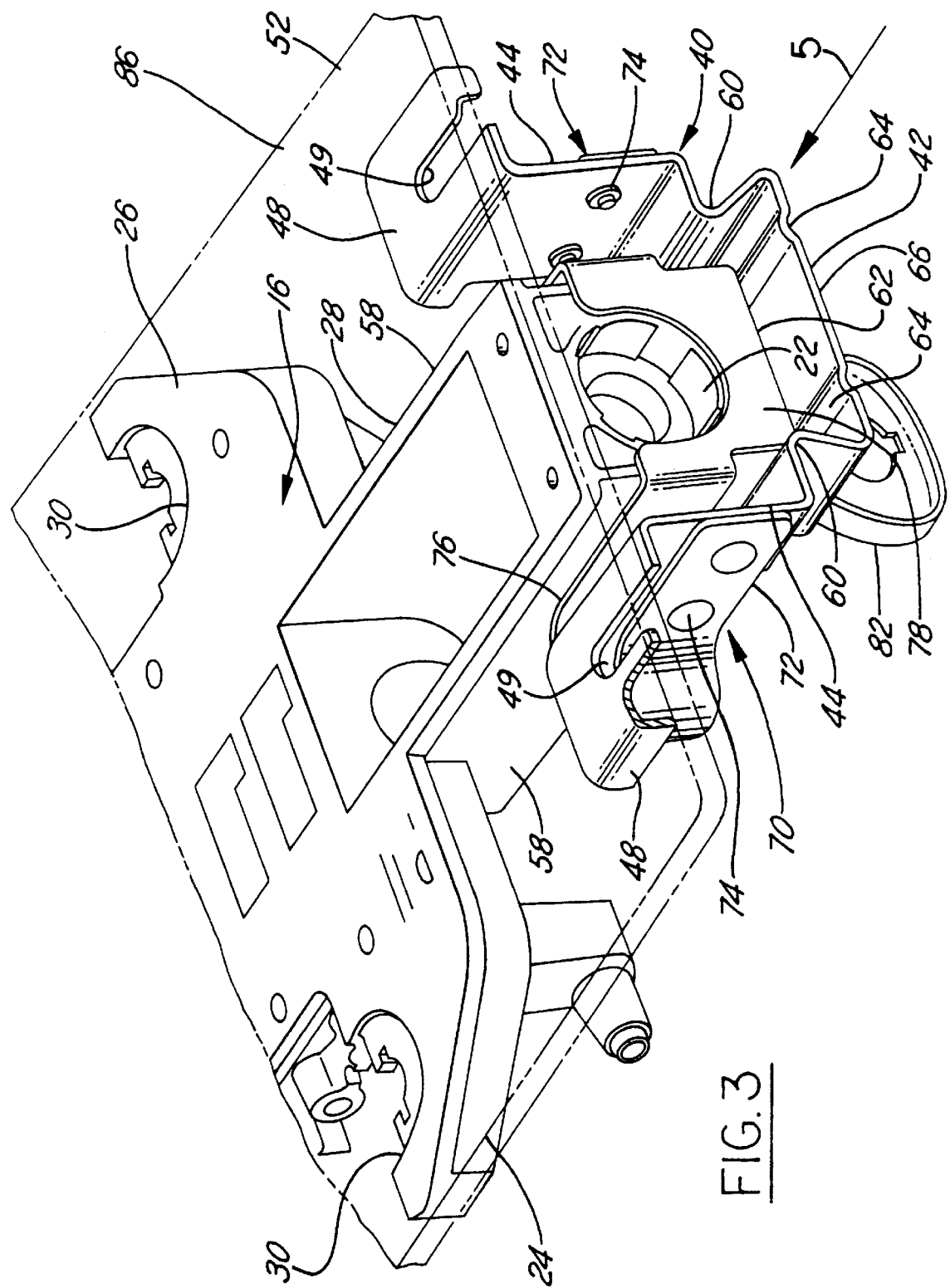
FIG. 3 is a fragmentary perspective view showing the upper mounting bracket slidably received in the channel of the lower mounting bracket. For clarity, the capsules for attaching the upper mounting bracket and the fasteners for attaching the lower mounting bracket are omitted.
Figure 4:
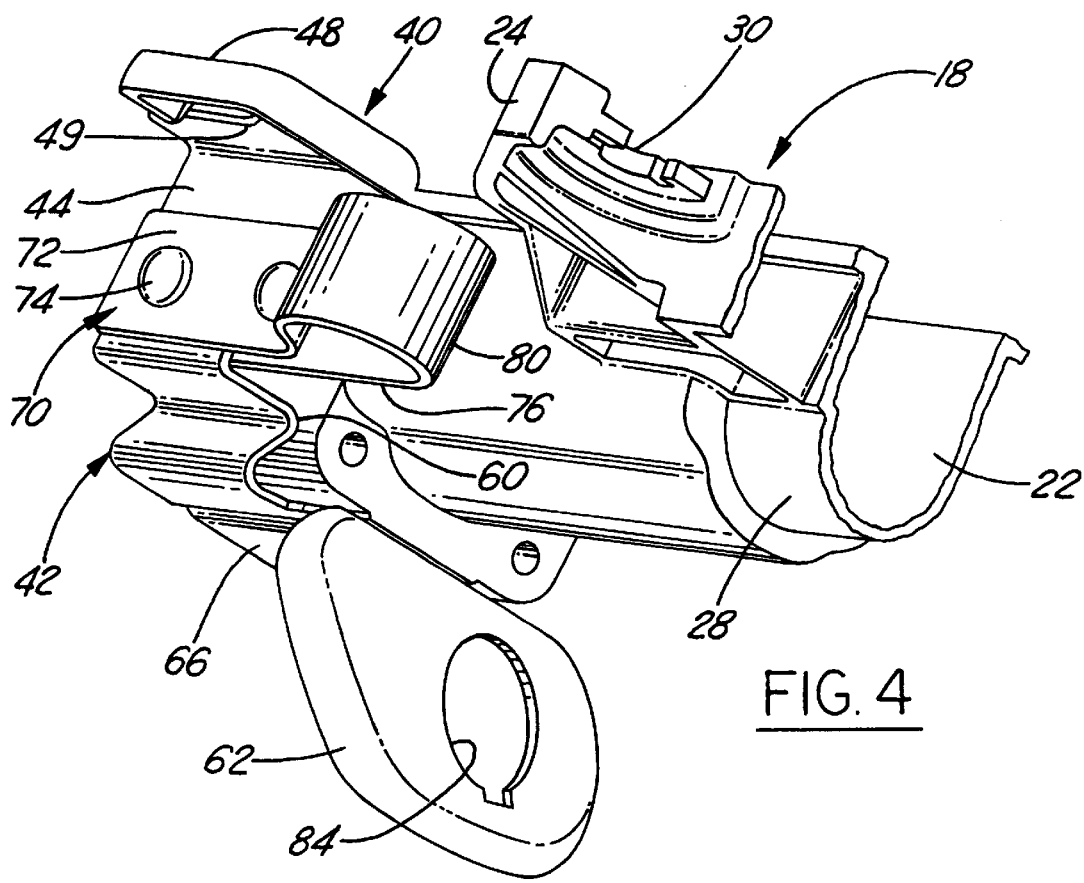
FIG. 4 is a fragmentary perspective view of a portion of the structure in FIG. 3 as viewed from a different angle.
Figure 5:
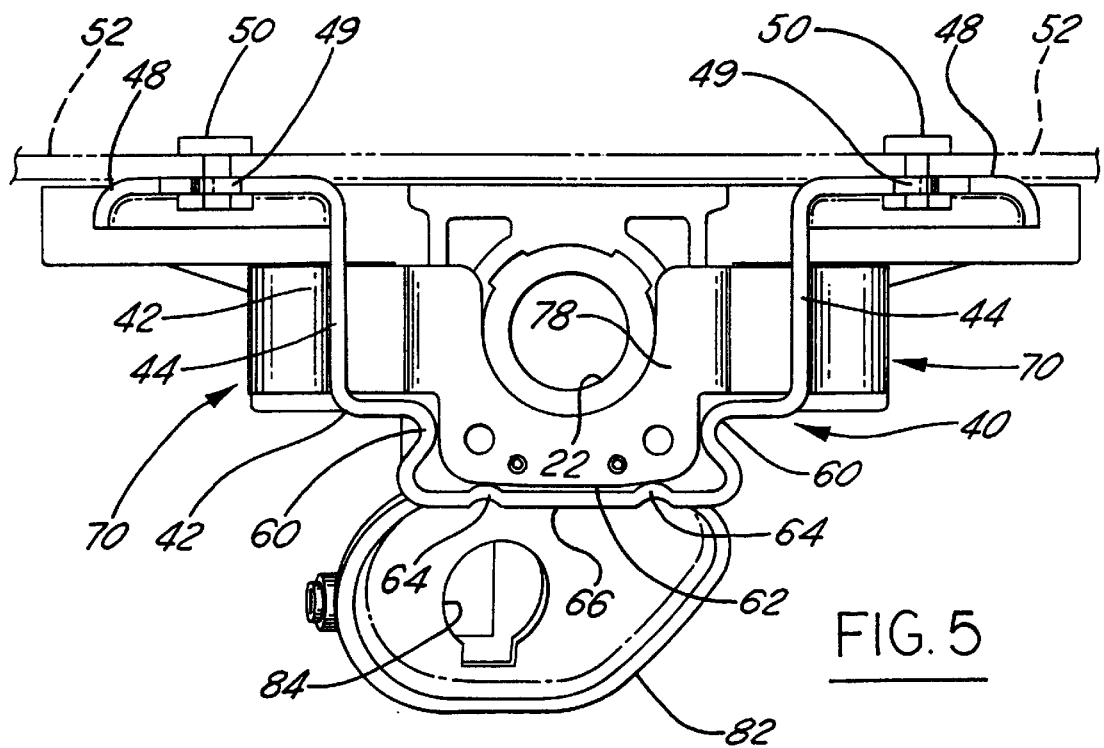
FIG. 5 is an elevational view looking in the direction of the arrow 5 in FIG. 3.

The lower end portion 28 of the upper mounting bracket is slidably received in the central channel 42 of the lower mounting bracket 40 as best seen in FIG. 3. The lower end portion 28 has parallel vertical side walls 58 which slidably engage the inwardly directed parallel ribs 60 formed in the side walls 44 of the channel 42 of the lower mounting bracket 40. The ribs 60 have a tight frictional engagement with the side walls 58 of the lower end portion 28. The bottom surface 62 of the lower end portion 28 of the upper mounting bracket rides on longitudinally extending beads 64 formed in the bottom wall 66 of the channel 42 of the lower mounting bracket 40. The beads 64 are parallel to the ribs 60.

To absorb energy and gradually and resiliently resist movement of the upper mounting bracket 16 as it slides downwardly and forwardly with the steering column when it collapses, a pair of laterally spaced bendable, flexibly resilient straps 70 are provided. The straps have laterally outer legs 72 secured as by fasteners 74 to the respective side walls 44 of the channel 42 of the lower mounting bracket 40. The straps 70 also have laterally inner legs 76 which are integrally connected to one another by a saddle 78. The legs 72, 76 and saddle 78 are integrally formed of one piece, but separate from the lower mounting bracket 40. The saddle 78 forms a cap which extends across and is rigidly secured to the lower end of the lower end portion 28 as shown in FIG. 3. The rear ends of the legs of each strap are integrally connected together by a loop 80 so that each strap is generally U-shaped in configuration.

Integrally formed with the lower mounting bracket 40 on the underside of the bottom wall 66 thereof is a transmission bracket 82 having a central opening 84 for receiving a transmission cable (not shown).

A portion 86 (FIG. 1) forming part of the vehicle support structure 34 closely overlies and is substantially parallel to the upper mounting bracket 16 from the capsules to the end of the lower end portion 28. The support structure permits the upper mounting bracket to move with the steering column as it collapses, but prevents any upward movement. Hence a rise in the steering column in the event of a frontal impact is strongly resisted and in many cases positively prevented by the support structure of the vehicle.

The legs 72 and 76 of the straps 70 extend lengthwise of the steering column. During collapse, the legs 76 will move with the steering column. However, the legs 72 will remain fixed to the lower mounting bracket 40 so that there will be a rolling action of the straps and a gradual absorption of energy, reducing the reaction forces of the steering column against the driver.

The resistance to axial movement of the steering column by the straps 70 can be varied by changing the thickness, dimensions, and material properties of the straps. This can be done without altering the structure of the lower mounting bracket 40, which is a separate member. The lower mounting bracket 40 must in all cases be strong and rigid.

What is claimed is:

1. Apparatus for supporting an elongated steering column of an automotive vehicle in a position extending in a downward and forward direction with respect to the vehicle comprising, rigid vehicle support structure, an upper mounting bracket, means securing said upper mounting bracket to a portion of said rigid vehicle support structure, said means being releasable in response to longitudinal collapse of the steering column in a frontal impact so that said upper mounting bracket is capable of collapsing with the steering column in said downward and forward direction, a lower mounting bracket, means securing said lower mounting bracket to another portion of said rigid vehicle support structure, and energy-absorbing means connecting said upper mounting bracket to the lower mounting bracket to gradually resist collapse of the upper mounting bracket and prevent excessive reaction forces of the steering column against a driver, said rigid vehicle support structure having a further portion which overlies said upper mounting bracket to resist upward displacement of said upper mounting bracket while permitting said upper mounting bracket to collapse with the steering column in said downward and forward direction.

2. Apparatus for supporting an elongated steering column of an automotive vehicle in a position extending in a downward and forward direction with respect to the vehicle comprising, rigid vehicle support structure, an upper mounting bracket having laterally spaced upper wing portions, means securing said upper wing portions of said upper mounting bracket to portions of said rigid vehicle support structure, said means being releasable in response to longitudinal collapse of the steering column in a frontal impact so that said upper mounting bracket is capable of collapsing with the steering column in said downward and forward direction, said upper mounting bracket having a downwardly and forwardly extending lower portion, a lower mounting bracket, means securing said lower mounting bracket to another portion of said rigid vehicle support structure, and energy-absorbing means connecting said lower end portion of the upper mounting bracket to the lower mounting bracket to gradually resist collapse of the upper mounting bracket and prevent excessive reaction forces of the steering column against a driver, said rigid vehicle support structure having a further portion which overlies said upper mounting bracket to resist upward displacement of said upper mounting bracket while permitting said upper mounting bracket to collapse with the steering column in said downward and forward direction.

3. Apparatus as set forth in claim 2, wherein said lower mounting bracket has means slidably supporting said lower end portion of the upper mounting bracket.

4. Apparatus as set forth in claim 3, wherein said means slidably supporting said lower end portion of the upper mounting bracket comprises a central channel portion of said lower mounting bracket, the lower end portion of the upper mounting bracket having a sliding friction fit in said central channel portion.

5. Apparatus as set forth in claim 2, wherein said energy absorbing means comprises flexible, bendable straps, each of said straps having a first leg connected to said lower portion of said upper mounting bracket, a second leg connected to said lower mounting bracket, and an integral, generally U-shaped loop portion connecting said legs.

6. Apparatus as set forth in claim 2, wherein said energy absorbing means comprises flexible, bendable straps, each of said straps having a first leg, a second, and an integral, generally U-shaped loop portion connecting said legs, said lower mounting bracket being formed separately from said straps, means rigidly securing the first legs of said straps to the lower end portion of said upper mounting bracket, and means rigidly securing the second legs of said straps to opposite side walls of the central channel portion of said lower mounting bracket.

7. Apparatus as set forth in claim 2, wherein said energy absorbing means comprises flexible, bendable straps, each of said straps having a first leg, a second, and an integral, generally U-shaped loop portion connecting said legs, said lower mounting bracket being formed separately from said straps, means rigidly securing the first legs of said straps to the lower end portion of said upper mounting bracket, means rigidly securing the second legs to opposite side walls of the central channel portion of said lower mounting bracket, the second legs of said straps are integrally connected to one another by an intermediate saddle, said straps and said saddle being of one piece, and said saddle forming a cap extending across and receiving and rigidly secured to the extremity of the lower end portion of the upper mounting bracket.

8. Apparatus as set forth in claim 7, wherein said lower mounting bracket has means slidably supporting said lower end portion of the upper mounting bracket.

9. Apparatus as set forth in claim 8, wherein said means slidably supporting said lower end portion of the upper mounting bracket comprises a central channel portion of said lower mounting bracket, the lower end portion of the upper mounting bracket having a sliding friction fit in said central channel portion.

* * * * *